United States Patent [19]

Thaler et al.

[11] Patent Number: 4,587,304

[45] Date of Patent: May 6, 1986

[54] SULFOMALEATION OF POLYOLEFINS

[75] Inventors: Warren A. Thaler, Flemington; Stanley J. Brois, Westfield; Francis N. Ferrara, Dunellen, all of N.J.

[73] Assignee: Exxon Research and Engineering Co., Florham Park, N.J.

[21] Appl. No.: 778,269

[22] Filed: Sep. 20, 1985

[51] Int. Cl.[4] .............................................. C08F 8/34
[52] U.S. Cl. ................................... 525/285; 525/284; 525/291; 525/331.8; 525/331.9; 525/348; 525/353

[58] Field of Search ............ 525/284, 285, 291, 331.8, 525/331.9, 348, 353

Primary Examiner—Paul R. Michl
Attorney, Agent, or Firm—Richard E. Nanfeldt

[57] ABSTRACT

The present invention relates to novel polymers which are sulfomaleic anhydride adducts of an unsaturated hydrocarbon, wherein the novel polymers are produced by contacting sulfomaleic anhydride or derivatives with an unsaturated hydrocarbon to form the novel polymer, which has a $\overline{M}_n$ of about 900 to about $10^7$.

8 Claims, No Drawings

SULFOMALEATION OF POLYOLEFINS

FIELD OF THE INVENTION

The present invention relates to novel polymers which are adducts of sulfomaleic anhydride its isomers or derivatives, with unsaturated organic molecules, wherein the novel products are produced by contacting sulfomaleic anhydride with an unsaturated polymer to form the novel product. In particular the unsaturated polymer can be a polyolefin polymer ranging in molecular weight from about 500 to about 10,000,000.

The resultant adduct of sulfomaleic anhydride and the unsaturated hydrocarbon polymer can be further reacted with: a polyamine, ammonia, amines or metallic bases which will neutralize the sulfonic acid group and react with the anhydride group as well. The products are ionomeric polymers which are useful as thermoplastic elastomers.

BACKGROUND OF THE INVENTION

Various unsaturated hydrocarbon polymers have been reacted with maleic anhydrides to form a variety of maleic anhydride adducts of unsaturated hydrocarbon polymers. The reactivity of maleic anhydride with many unsaturated hydrocarbon polymers is poor and in some instances, as for example with EPDM rubber, even employment of extensive heating is ineffective. Free radical reactions which graft maleic anhydride onto the unsaturated hydrocarbon polymer have been utilized as alternative routes. Free radical grafting leads to chain scission, crosslinking and solvent grafting if the solvent is sufficiently reactive. The reaction of sulfomaleic anhydride with the unsaturated hydrocarbon polymer overcomes these aforementioned deficiencies in that the sulfomaleic anhydride can be reacted with the unsaturated hydrocarbon polymer at moderate temperatures in either the bulk or solution state without the employment of free radical initiators. Subsequent neutralization and reaction of the anhydride groups of resultant adduct of sulfomaleic anhydride with unsaturated hydrocarbons produces valuable ionomers which are useful as thermoplastic elastomers and solution viscosifiers.

SUMMARY OF THE INVENTION

One embodiment of this invention is the production of ion containing polymers (ionomers) especially sulfonate ionomers, by a non-sulfonation route. Another embodiment of this invention is the activation of maleic anhydride or its derivatives towards Alder "Ene" reactions or Diels-Alder reactions, such that polymers which have unsaturated sites will readily form adducts. In particular polymers such as EPDM rubbers which do not undergo thermal reaction readily with maleic anhydride will now react facily.

Examples of sulfomaleic anhydride, its isomers and derivatives which are suitable for this reaction include but are not limited to the following:

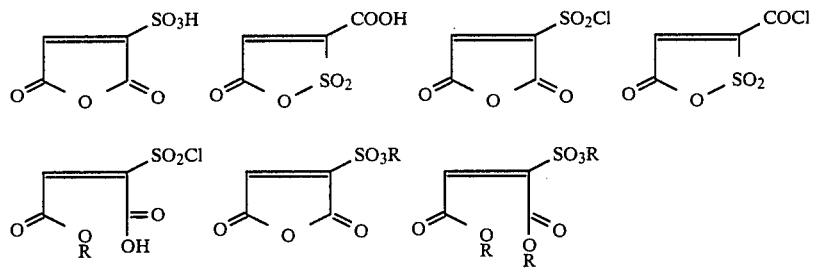

where R=H, alkyl, alkylsilyl, aryl, etc.

GENERAL DESCRIPTION

The present invention relates to polymers which are sulfomaleic anhydride adducts with unsaturated hydrocarbons which are formed by reacting sulfomaleic anhydride with an unsaturated hydrocarbon in either the solution or the bulk state.

Sulfomaleic anhydride which is represented by the formula:

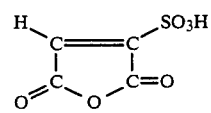

is formed by reacting maleic anhydride with sulfur trioxide. Besides sulfomaleic anhydride, one can also employ sulfomaleic acid, sulfofumaric acid, sulfoacrylic anhydride and their various esters, derivatives of either or both of the carboxyl groups.

The sulfomaleic anhydride is reacted with an unsaturated hydrocarbon polymer which is selected from the group consisting of EPDM terpolymers, EPR, polyisoprene, polybutadienes, Butyl rubber, styrene-butadiene and styrene-isoprene "random" and block copolymers, Butyl rubbers, polybutenes, hydrocarbon resins such as a Escorez resins, etc. Oligomers or polymers which have olefin functionality near the end of the chain are of interest. Such molecules include, but are not limited to, polyisobutene and polybutenes of various molecular weights. Vistanex, Vistanex J are examples of such polymers. Plastics such as polyethylene and polypropylene containing low levels of unsaturation are also suitable polyolefins.

The expression "Butyl rubber", as employed in the specification and claims, is intended to include copolymers made from a polymerization reaction mixture having therein from 70 to 99.5% by weight of an isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128, which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g., 2%.

Illustrative of such a Butyl rubber is Exxon Butyl 365 (Exxon Chemical Co.), having a mole percent unsaturation of about 2.0% and a Mooney viscosity (ML, 1+3. 212° F.) of about 40 to 50.

Low molecular weight Butyl rubbers, i.e. Butyl rubbers having a viscosity average molecular weight of about 5,000 to 85,000, and a mole percent unsaturation of about 1 to about 5%, may be sulfonated to produce the polymers useful in this invention. Preferably, these polymers have a viscosity average molecular weight of about 25,000 to about 60,000.

The EPDM terpolymers are low unsaturated polymers having about 0.5 to about 10.0 wt.% olefinic unsaturation, more preferably about 2 to about 8, most preferably about 3 to 7 defined accordingly to the definition as found in ASTM-1418-64 and is intended to mean terpolymers containing ethylene and propylene in the backbone and an olefin residue in the side chain as result of multi-olefin incorporation in the backbone. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt.% ethylene and about 1 to about 10 wt.% of a diene monomer, the balance of the polymer being propylene. Preferably, the polymer contains about 45 to about 70 wt.% ethylene, e.g. 50 wt.% and about 2.6 to about 8.0 wt.% diene monomer, e.g. 5.0 wt.%. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-norbornene, methyl tetrahydroindene and 4-methyl-5-methylene-2-norbornene.

A typical EPDM is Vistalon 2504 (Exxon Chemical Co.), a terpolymer having a Mooney viscosity (ML, 1+8, 212° F.) of about 40 and having an ethylene content of about 50 wt.% and a 5-ethylidene-2-norbornene content of about 5.0 wt.%. The $\overline{M}_n$ as measured by GPC of Vistalon 2504 is about 47,000, the $\overline{M}_v$ as measured by GPC is about 145,000 and the $\overline{M}_w$ as measured by GPC is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}_n$ as measured by GPC of Vistalon 2504-20 is about 26,000, the $\overline{M}_v$ as measured by GPC is about 90,000 and the $\overline{M}_w$ as measured by GPC is about 125,000.

Nordel 1320 (Dupont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight ($\overline{M}_n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}_v$ as measured by GPC of the EPDM terpolymer is preferably below about 350,000 and more preferably below about 300,000. The $\overline{M}_w$ as measured by GPC of the EPDM terpolymer is preferably below about 500,000 and more preferably below about 350,000.

Other suitable olefin polymers include polymers comprising a major molar amount of $C_2$ to $C_5$ mono-olefins, e.g., ethylene, propylene, butylene, isobutylene and pentene. The polymers may be homopolymers such as polyisobutylene, as well as copolymers of two or more such olefins such as copolymers of ethylene and propylene, butylene and isobutylene, propylene and isobutylene and the like.

The reaction of the sulfomaleic anhydride or its ester derivatives with the unsaturated hydrocarbon polymer can occur in solution, in a melt and in polymer processing equipment such as a rubber mill, a Brabender, an extruder or a Banbury mixer.

The polymer of the sulfomaleic adduct with the unsaturated hydrocarbon can be covalently bonded through its anhydride group with molecules containing polar groups. Such polar functionality molecules can be low molecular weight compounds, oligomers or polymers. Of particular interest are molecules containing amine functionality. Polyamines provide polarity to form molecules with a polar head and a hydrocarbon tail in addition to the ionic sulfonate site.

The sulfonic acid group of the sulfomaleic anhydride can be neutralized with ammonia, primary secondary or tertiary amines including the aforementioned amino compounds, or metal counterion selected from the group consisting of iron, lead, aluminum and groups IA, IIA, IB and IIB of the Periodic Table of Elements. The neutralization of the sulfonic acid groups of the sulfomaleic anhydride adduct of the unsaturated hydrocarbon polymer can be accomplished either in solution, in a melt or in polymeric processing equipment, as previously defined.

DESCRIPTION OF THE PREFERRED EMBODIMENTS

The following examples illustrate the present invention without, however, limiting the same hereto.

EXAMPLE 1

EPDM Rubber with Sulfomaleic Anhydride

A solution of 50 g of dry EPDM Rubber (Vistalon 2504) in 1000 ml of dry xylene was heated at 130° C. and stirred under nitrogen and 2.67 g (15 mmole) of sulfomaleic anhydride was added and heating continued for four Hrs.

After cooling the sulfonic acid was neutralized and the anhydride reacted with excess methyl amine (21.2 g). The polymer solution became extremely viscous and began to climb the stirrer indicating that a polymeric methylammonium sulfonate ionomer had been formed. Methanol (50 ml) was added to attenuate the strong intermolecular associations and the viscosity decreased.

After standing overnight the polymer was precipitated in a high speed mixer with 4000 ml of isopropyl alcohol-water (70:30), collected on a filter and washed again in the mixer with another portion of IPA-water. A small quantity of Irganox 1010 antioxidant was added and the polymer filtered and vacuum dried at 50° C.

Microanalysis indicated that the resulting product contained 0.46% S (14.2 mmole/100 g) and 0.265% N (18.9 mmole/100 g).

Treatment of a solution of the modified polymer in 95:5 toluene methanol with excess sodium methoxide in methanol to free ionically bound methylamine and isolation as the sodium salt gave a product whose analysis showed 0.40% S (12.5 mmole/100 g) and 0.115%N (8.2 mmole/100 g).

EXAMPLE 2

EPDM Rubber with chlorosulfonyl maleic anhydride

According to the method of example 1, 2.95 g of chlorosulfonylmaleic anhydride was reacted with 50 g of Vistalon 2504 EPDM rubber, followed by reaction of the sulfonyl chloride and carboxylic anhydride groups with excess methylamine. The polymer was isolated and cleaned as in example one.

Microanalysis indicated the presence of 0.46% S (14.2 mmole/100 g) and 0.359% N (25.6 meq/100 g). Some gelation of the polymer product was observed.

Treatment of this polymer with sodium methoxide solution and isolation as in example one gave a product whose microanalysis showed 0.39% S (12.2 mmole/100 g) and 0.194% N (13.8 mmole/100 g).

EXAMPLE 3

Butyl Rubber with chlorosulfonyl maleic anhydride

According to the method of example 1, 2.95 g of chlorosulfonyl maleic anhydride was reacted with 50 g of Butyl Rubber (Exxon 365 Butyl Rubber). After treatment with methylamine, the isolated polymer contained 0.47% S (14.7 mmole/100 g) and 0.468% N (33.4 mmole/100 g). Further reaction with sodium methoxide gave a polymer whose elemental analysis showed 0.45% S (14.4 mmole/100 g) and 0.215% N (15.3 mmole/100 g).

EXAMPLE 4

EPDM Rubber with 2-chloroformyl-3-sulfoacrylic anhydride

According to the method of example 1, 50 g of EPDM (V-2504) and 2.95 g of 2-chloroformyl-3-sulfoacrylic anhydride were reacted. After treatment with methylamine the isolated polymer contained 0.40% S (12.5 mmole/100 g) and 0.445% N (32.1 mmole/100 g). After treatment with sodium methoxide the isolated polymer gave the following microanalysis: 0.52% S (16.3 mmole/100 g) and 0.205% N (14.6 mmole/100 g).

EXAMPLE 5

EPDM Rubber with the methyl ester of chlorosulfonyl maleic anhydride

Chlorosulfonyl maleic anhydride was reacted with one molar equivalent of methanol in chloroform solution. The chloroform was removed under vacuum and 3.43 g of the resulting product was reacted with 50 g of V-2504 EPDM according to the method of Example 1. After treatment with methylamine, the isolated polymer, according to microanalysis contained 0.38% S (11.9 mmole/100 g) and 0.179% N (12.8 mmole/100 g). After treatment with sodium methoxide the analysis showed 0.36% S (11.2 mmole/100 g) and 0.089% N (6.4 mmole/100 g).

EXAMPLE 6

Conjugated Diene Butyl with sulfomaleic anhydride

According to the method of example 1, 2.67 g of sulfomaleic anhydride was reacted with 50 g of CD Butyl 7614. After treatment with methylamine and isolation the product contained 0.38% S (11.9 mmole/100 g) and 0.248% N (17.7 mmole/100 g).

EXAMPLE 7

Bulk Reaction of EPDM with sulfomaleic anhydride

Vistalon 2504 EPDM (50 g) was fluxed on a 3" electric mill at 120° C. Sulfomaleic anhydride (1.05 g) was added slowly. After the addition was complete the sample was mixed for a few minutes and zinc stearate (2.35 g) was added and mixing continued for a few minutes longer.

The resulting product was a tough elastic material that resembled a crosslinked rubber. However, the product was soluble in 95:5 toluene:methanol indicating that the product was a thermoplastic elastic "ionomer".

EXAMPLE 8

Polyisobutylene with sulfomaleic anhydride

About 250 g of polyisobutylene ($\overline{M}n=900$) was dissolved in 200 ml of xylene at room temperature under a nitrogen blanket. To the stirred xylene solution was gradually added 60 g of sulfomaleic anhydride at about 35° C. The reaction mixture was refluxed for about eight hours, and then concentrated by roto-evaporation. The residue was taken up in 2.5 L of ether and washed twice with 500 ml portions of water. The ether solution was dried over MgSO4, filtered, and concentrated by roto evaporation to give a sulfomaleated product which analyzed for 0.33% sulfur.

EXAMPLE 9

Sulfonated EPDM Thermoplastic Elastic Ionomers from EPDM and Sulfomaleic Anhydride Royalene 521 EPDM rubber, 50 g (mill dried) dissolved in 1,000 ml dry xylene was treated with 2.67 g of sulfomaleic anhydride for 4 hours at 130° C. After cooling, the resulting product was neutralized with either zinc methoxide, sodium methoxide or zinc acetate in methanol. A substantial viscosity increase was noted upon addition of the base. Additional methanol was added when necessary to reduce the viscosity. Stirring was continued to 0.5 hour and the polymer was isolated from isopropanol in a high speed mixer. The resulting crumb was dried in a vacuum oven at 50° C.

EXAMPLE 10

Sulfonated EPDM Thermoplastic Elastic Ionomers from EPDM and Sulfomaleic Anhydride Ester (Methoxysulfonyl Maleic Anhydride)

According to the method of the previous Example Royalene 521 EPDM rubber in xylene was reacted with sulfomaleic anhydride methyl ester at the rate of 15 or 10 mmole per 100 g of polymeric and the product neutralized and isolated as before.

EXAMPLE 11

Tensile Properties

The products of Examples 9 and 10 were compounded with 10 parts zinc stearate and 0.5 parts Irgan×1010 on a hot mill (140°-170° C.) for 20 minutes. The compounds were pressed at 192° C. into pads which were cut into dumbbells for testing on an Instron (Model 1122).

Tensile results in the Table below show that the products are strong ionomers when compared with the modified EPDM (Royalene 521). The products also compare favorably with sulfonated EPDM, suggesting even stronger associations at a given sulfur level.

| TENSILE PROPERTIES OF SULFONATED AND SULFOMALEATED EPDM | | | | | | |
|---|---|---|---|---|---|---|
| Reagent Type | Mmole Sulfonate Per 100 g EPDM | | Neutralization | 100% Modulus (psi) | Tensile Strength (psi) | Elongation 1% |
| | Charged | Analysis | | | | |
| Sulfomaleic Anhydride | 30 | 18.7 | Sodium Methoxide | 358 | 1,005 | 235 |
| Sulfomaleic Anhydride | 30 | 16.5 | Zinc Methoxide | 246 | 2,043 | 534 |
| Sulfomaleic Anhydride | 30 | 17.2 | Zinc Acetate | 259 | 1,831 | 522 |
| Sulfomaleic Anhydride Methyl Ester | 15 | 13.6 | Sodium Methoxide | 215 | 1,400 | 451 |
| Sulfomaleic Anhydride Methyl Ester | 15 | 12.6 | Zinc Methoxide | 257 | 898 | 357 |
| Sulfomaleic Anhydride Methyl Ester | 10 | 7.95 | Zinc Acetate | 209 | 2,781 | 734 |
| Uniroyal 1E1025 | — | 8.73 | (Zinc Acetate) | 147 | 1,381 | 1,073 |
| Uniroyal 1E2560 | — | 23.7 | (Zinc Acetate) | 336 | 3,524 | 581 |
| Royalene 521 | — | — | — | 57 | 35 | 592 |

What is claimed is:

1. A polymer which is a sulfomaleic anhydride adduct or sulfoester maleic anhydride adduct with an unsaturated hydrocarbon polymer.

2. A polymer according to claim 1 wherein said unsaturated hydrocarbon polymer is selected from the group consisting of ethylene propylene terpolymers, ethylene propylene copolymers, polyisoprene, Butyl rubber, polybutadiene, and styrene-butadiene, and styrene-isoprene random and block copolymers, polypropylenes and polyisobutylenes, as well as plastic polypropylene copolymers or polyethylene copolymers.

3. A polymer according to claim 2 wherein the sulfonic acid groups of the sulfomaleic anhydride adduct with the unsaturated hydrocarbon polymer are neutralized with a metal counterion selected from the group consisting of iron, aluminum, lead and Groups IA, IIA, IB and IIB of the Periodic Table of Elements.

4. A polymer according to claim 1 wherein the sulfonic acid groups of the sulfomaleic anhydride adduct with the unsaturated hydrocarbon polymer is neutralized with ammonia or an organic amine.

5. An ionomer according to claim 3 which is useful as a thermoplastic elastic.

6. An ionomer composition wherein the products of claim 5 are compounded with an ionic plasticizer.

7. A polymer which is an adduct of a sulfomaleic anhydride derivative or isomer.

8. Polymer adduct of claim 7 wherein the sulfomaleic derivative or isomer is selected from the group including halosulfonyl maleic anhydride, alkoxy sulfonylmaleic anhydrides, $\beta$-sulfoacrylic anhydrides.

* * * * *